United States Patent [19]

Yee

[11] Patent Number: 4,869,820

[45] Date of Patent: Sep. 26, 1989

[54] FILTER APPARATUS FOR FLUIDS WITH CO-AXIALLY STACKED FILTER ELEMENTS

[75] Inventor: Skipper K. Yee, Stockton, Calif.

[73] Assignee: Gary Karlin, Chicago, Ill.

[21] Appl. No.: 274,726

[22] Filed: Nov. 10, 1988

Related U.S. Application Data

[63] Continuation of Ser. No. 120,589, Nov. 13, 1987, abandoned, which is a continuation of Ser. No. 762,662, Aug. 5, 1985, abandoned.

[51] Int. Cl.$^4$ .............................................. B01D 27/04
[52] U.S. Cl. .................................. 210/316; 210/416.5; 210/437; 210/DIG. 13; 55/485; 55/498; 55/500; 55/520
[58] Field of Search .................... 210/314, 316, 321.74, 210/321.83, 416.5, D13, 437; 55/482, 483, 485, 497, 498, 500, 520

[56] References Cited

U.S. PATENT DOCUMENTS

| | | | |
|---|---|---|---|
| 2,253,685 | 8/1941 | Burckhalter | 210/D13 |
| 2,748,949 | 6/1956 | James | 210/D13 |
| 2,843,268 | 7/1958 | Kennedy | 210/D13 |
| 3,095,370 | 6/1963 | Krogman | 210/D13 |
| 3,308,956 | 3/1967 | Yee et al. | 210/232 |
| 3,353,680 | 11/1967 | Niebergall | 210/314 |
| 3,390,778 | 7/1968 | Uhen | 210/314 |
| 3,465,883 | 9/1969 | Jumper | 210/316 |
| 3,837,495 | 9/1974 | Baldwin | 210/314 |
| 3,975,273 | 8/1976 | Shaltz et al. | 210/314 |

FOREIGN PATENT DOCUMENTS 2094652 1/1985 United Kingdom .

Primary Examiner—Richard V. Fisher
Assistant Examiner—Wanda L. Millard
Attorney, Agent, or Firm—Donald A. Peterson; Herbert D. Hart, III

[57] ABSTRACT

An axial oil filter including at least one pair of axially aligned filter elements includes an elongate filter body and a removable filter cartridge. The filter elements are mounted on an axial conduit which is a part of the filter cartridge, and the filter cartridge placed in the filter body so as to define upper and lower chambers, and a bypass flow path between the upper and lower chambers. Fluid to be filtered may flow into either of the chambers and will flow upward through the lower filter element and downward through the upper filter element. The filtered fluid is collected from a passage defined by a screen between the two filter elements, and passes outward from the filter through the outlet port.

10 Claims, 2 Drawing Sheets

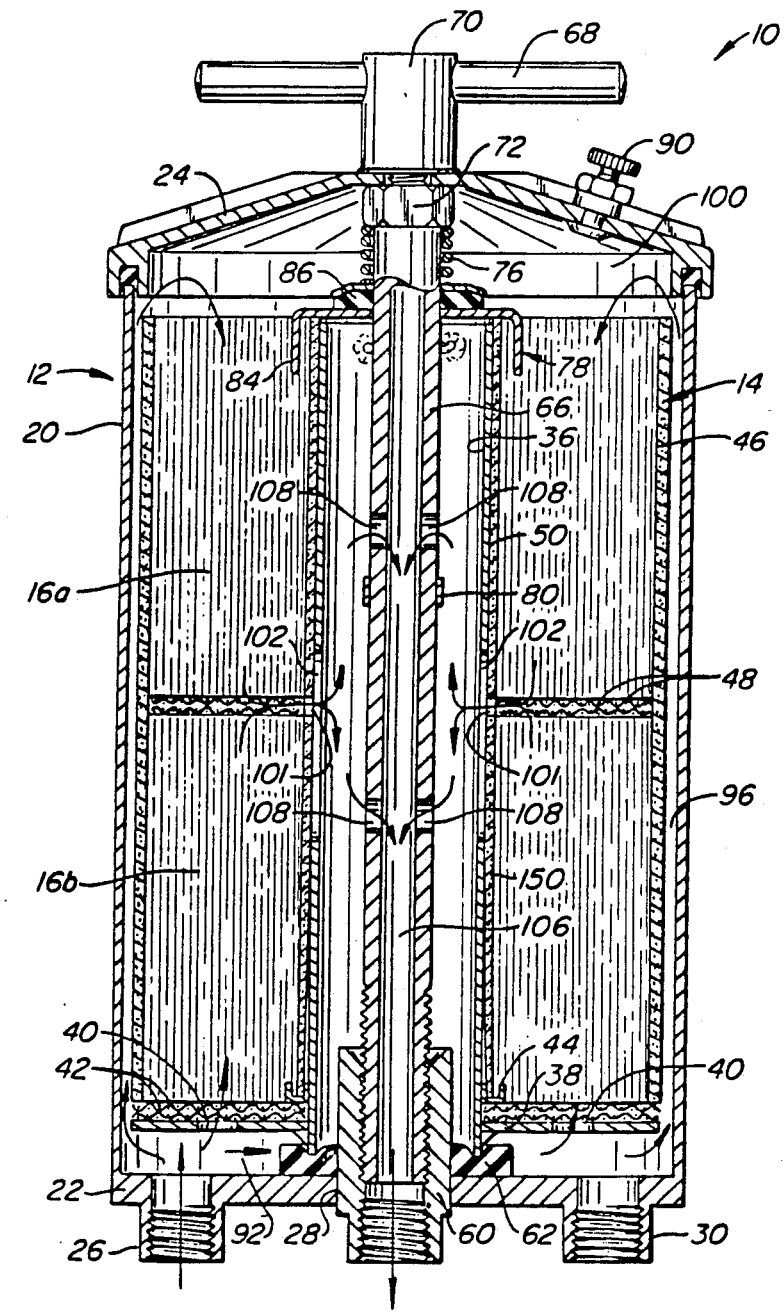
FIG._1.

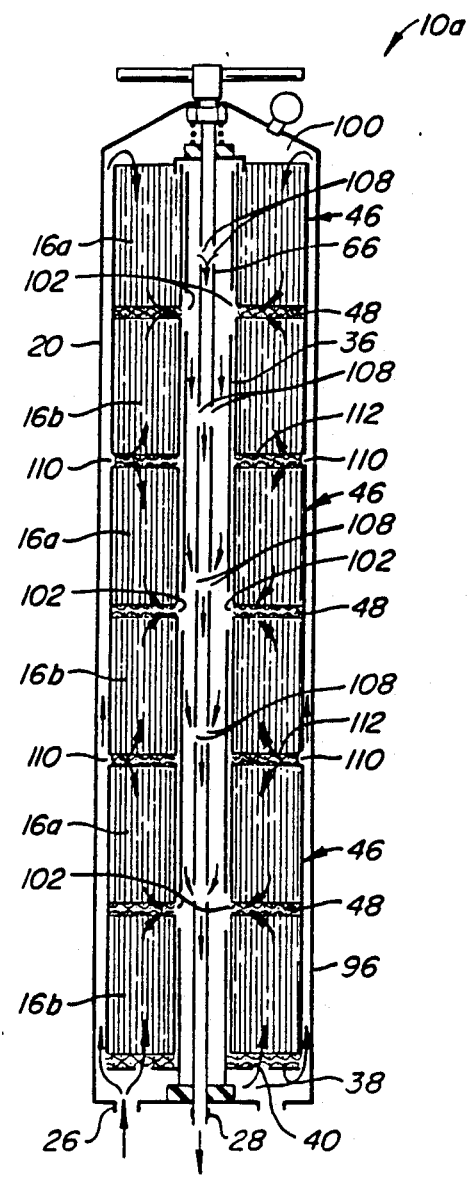
FIG._2.

FILTER APPARATUS FOR FLUIDS WITH CO-AXIALLY STACKED FILTER ELEMENTS

This application is a continuation, of application Ser. No. 120,589 filed Nov. 13, 1987, which is a continuation of Ser. No. 762,662 filed Aug. 5, 1985, both now abandoned.

BACKGROUND OF THE INVENTION

1. Field of the Invention

The present invention relates generally to filtering devices and, more particularly, to an opposed axial flow filtering apparatus having a plurality of filtering elements arranged in pairs which allows for flow modulation over a wide range.

2. Description of the Prior Art

An axial flow filter is disclosed in U.S. Pat. No. 3,308,956 to Yee et al., and an improved version of this filter is described in British Patent No. 2,094,652 B. The oil filters described in these two patents are generally suitable for bypass filtering of circulating oil in an internal combustion engine, and provide for axial flow of the oil in one direction through a single annular filter element. Although suitable for their intended use, it is difficult to adapt these filters to accomodate a wide range of flow rates or to adjust the pressure drop across the filter, as would be desirable in a number of other fluid filtering applications.

It would therefore be desirable to provide an axial flow filter which can be adapted to handle widely varying flow rates, as well as having an adjustable pressure drop through the filter.

SUMMARY OF THE INVENTION

An axial flow filtering apparatus includes at least one pair of spaced-apart filter elements mounted in a single filter cartridge. The filter cartridge, in turn, is mounted in an elongate filter body having a fluid inlet port and outlet port formed therein. The filter cartridge includes an axial conduit running its entire length, and the cartridge and elongate body together define an annular flow path from one end of the body to the other. In this way, fluid which is introduced through the inlet can flow to both ends of the cartridge and pass inward through the filter elements in opposed directions. The axial conduit is in fluid communication with the outlet, and fluid flowing through the filter elements collects in the space between the filter elements, from where it flows into the axial conduit through openings formed in the conduit wall.

Two or more pairs of filter elements may be mounted in the filter cartridge in order to increase the filter capacity. When mounting such multiple pairs of filter elements, however, it will be necessary to provide fluid inlets through the wall of the cartridge to allow flow of fluid from the annular passage to the filters. Filtered fluid will flow from the filter elements through additional openings provided in the axial conduit.

In the preferred embodiment, a return or outlet tube is located axially within the axial conduit. The outlet tube is attached to the outlet port, and one or more return ports are formed in the wall of the outlet tube. The pressure drop through the filter may thus be controlled by properly selecting the number and size of the outlet ports in the outlet tube.

BRIEF DESCRIPTION OF THE DRAWINGS

FIG. 1 is an elevational view of a filtering apparatus constructed according to the present invention, illustrated in cross-section.

FIG. 2 is an elevational schematic view of a filtering apparatus having three pairs of filtering elements constructed in accordance with the present invention, illustrated in cross-section.

DESCRIPTION OF THE PREFERRED EMBODIMENT

According to the present invention, a filtering apparatus 10 includes an elongate, cylindrical body 12, a filter cartridge 14 mounted in the body 12, and a pair of filter elements 16a and 16b mounted in tandem with a space therebetween inside the cartridge 14. The elongate body 12 comprises a cylindrical wall 20 terminating at its lower end in base plate 22, and having a removable cap member 24 at its upper end. As used hereinafter and in the claims, all references to upward and downward directions will be made in reference to the orientation of FIG. 1.

The cylindrical wall 20 and base plate 22 of the elongate body 12 form a unitary structure having four openings. Threaded inlet port 26, outlet port 28, and threaded stop cock port 30 are provided in the base plate 22, while the fourth opening consists of the open upper end of the cylindrical wall 20. In use, the inlet port 26 will be connected to a source of fluid to be filtered, while the outlet port 28 will be connected to a reservoir or other receiving means for collecting the filtered fluid. The stop cock port 30 will be sealed with a closed stop cock (not shown), while the upper end will be covered and sealed by the cap 24, as illustrated in FIG. 1. Thus, all fluid entering through inlet port 26 must flow outward through outlet port 28, after having passed through the internal filter elements, as will now be described in detail.

Filter cartridge 14 includes an axial conduit 36 having an inlet plate 38 secured to its lower end. Inlet plate 38 is a disk having a plurality of openings 40 formed therein. The inlet plate 38 acts as a baffle in preventing incoming flow through port 26 from impinging directly on the lower filter element 16b. One or more screens 42 are mounted on the upper surface of plate 38 and held in place by a flange member 44.

Filter elements 16 are mounted in a cylindrical holder 46 and have one or more screen members 48 therebetween. The cylindrical holder 46 is open at its upper and lower ends so that oil may flow into the upper element 16a through the open upper end and into the lower filter element 16b through the lower open end. Oil flows outward from both filter elements into the space between the elements and through the screens 48, as will be described in detail hereinafter.

The filter elements 16 may be common tissue rolls, i.e., a continuous roll of tissue paper wrapped around a cardboard cylinder. As illustrated, the cardboard cylinder is shown as reference number 50. To assemble the filter cartridge 14, the filter elements 16 are first placed in the filter element carrier 46 with the screen element 48 therebetween. The assembly of the filter elements 16 and the filter element carrier 46 is then placed over the axial conduit 36 so that the cardboard cores 50 of the filter elements are disposed against the outer cylindrical surface of the axial conduit 36. The filter carrier 46 is urged downward on the conduit 36 so that the flange member 44 penetrates into the lower filter element 16b to prevent bypass flow of oil between the filter element core 50 and the axial conduit 36.

A threaded coupling member 60 is secured in the outlet port 28, and includes a central bore which is threaded at either end. A resilient gasket 62 is mounted on the upper surface of the baseplate 22, circumscribing the coupling member 60 as illustrated. When the filter cartridge 14 is placed in the cartridge body 12, the lower end of the axial conduit 36 is urged against the resilient gasket 62, forming a complete seal between the interior and exterior of the axial conduit.

Cap member 24 includes a return tube 66 which is rotatably mounted at the center of the cap. Handle bar 68 is attached to the return tube through turret 70. The assembly of the return tube 66, handle bar 68, and turret 70 is held in place by bolt 72.

A spring 76 depends from the lower end of bolt 72, and a flange member 78 is mounted to slide freely between the spring 76 and a stop member 80 on the return tube 66. Flange member 78 includes a skirt portion 84 and a resilient backing member 86. After mounting the filter cartridge 14 in the filter body 12, the cap 24 is placed on the filter 10 by inserting return tube 66 down the center of axial conduit 36. The lower end of return tube 66 is threaded, and may be secured to coupling member 60 by rotation of handle bar 68. When the return tube 66 is in place, the skirt portion 84 of flange member 78 penetrates the upper face of filter element 16a, to prevent bypass flow of oil between the cardboard core 50 and the axial conduit 36. The flange member is held firmly in place by the force of spring 76 which is under compression.

Cap 24 includes pressure relief valve 90 which is a threaded valve which may be opened by rotation.

In operation, fluid to be filtered enters through inlet port 26, flowing into inlet chamber 92 defined between the upper surface of base plate 22 and the lower surface of inlet plate 38. Fluid in inlet chamber 92 will flow upward into filter element 16b through ports 40 in the inlet plate, and will also flow upward through annular bypass 96 formed between the inner surface of cylindrical wall 20 and the outer surface of filter carrier 46. Fluid flowing upward through the annular bypass will flow into chamber 100 defined between the lower surface of cap 24 and the upper surface of filter element 16a. Fluid from chamber 100 will flow downward into filter element 16a, in the opposite direction of the fluid flowing in the filter element 16b. The fluids from both filter elements 16a and 16b flow into the space between the elements defined by screen members 48. At that point, there is a gap 101 between the cardboard cores 50, and at least a pair of slits 102 formed in the axial conduit 36. Fluid is thus able to flow from both filter elements 16a and 16b into the interior of the axial tube 36. The interior of axial tube 36 is sealed at its upper end by flange member 78, and at its lower end by gasket 62. Thus, fluid in the interior of axial tube 36 must flow outward through coupling member 60 in outlet port 28. As illustrated, the outward flow path is defined by the lumen 106 of return tube 66, which is open to the interior of axial tube 36 through a plurality of return ports 108. The size and the number of return ports can be selected to provide a desired pressure drop through the filter 10.

The filter 10 just described is suitable for filtering a wide variety of fluids, typically fluids having entrained particles which are to be removed in order to recycle the fluid. Fluids which may be filtered by the apparatus of the present invention include cooking oils, hydraulic fluids, dry cleaning fluids, spent motor oil, water, gasoline, diesel fuel, and the like. After filter element 16 become exhausted, the filter elements may be easily removed and replaced by removing and replacing the filter carrier 46 of the filter cartridge.

An alternate embodiment 10a of the filtering apparatus of the present invention is illustrated in FIG. 2. The filtering apparatus of FIG. 2 includes three pairs of filtering elements 16 which are mounted on a common axial conduit 36 in order to provide increased flow capacity for the filter. The components of the filter of FIG. 2 are generally the same as those described for the embodiment of FIG. 1, except that the cylindrical wall 20, axial conduit 36, and return tube 66 must be lengthened to accommodate the increased number of filters mounted on the axial conduit. Additionally, separate filter carriers 46 will be provided for each pair of filter elements 16a and 16b.

Operation of the multiple stage filter 10a is similar to that of filter 10, except that provisions are made to provide for parallel flow through each pair of filter elements 16a and 16b. Fluid to be filtered enters through inlet port 26 and flows upward into the lowermost filter element 16b through ports 40 and inlet plate 38, as described previously. Bypass flow flows upward through annular passage 96 toward upper chamber 100, also as previously described. Ports 110, however, are provided in each filter carrier 46 at elevations corresponding to screen members 112 which lie between adjacent filter carriers 46. Thus, screen members 112 serve as flow paths for incoming fluid from the annular bypass 96. Fluid from bypass 96 can flow upward into the lower filter element 16b and downward into the upper element 16a, as indicated by arrows. The flow from filter elements 16a and 16b in an individual pair collect at the intermediate screen 48 and are discharged into the interior of axial conduit 36 through slots 102, as described previously. Return tube 66 will include a plurality of return ports 108 along its length to allow flow of filtered fluid through the tube and out outlet port 28.

Although the foregoing invention has been described in some detail by way of illustration and example for purposes of clarity of understanding, it will be obvious that certain changes and modifications may be practiced within the scope of the appended claims.

What is claimed is:

1. A filtering apparatus for fluids comprising: an elongate body having wall, top and bottom means defining a cartridge receiving chamber and having fluid inlet and outlet means formed therein;
   a cylindrical filter cartridge means removably mounted in said chamber, said cartridge means including an outer cylindrical filter holder which is open at each end and an inner, co-axial, cylindrical conduit means extending the length thereof, said cartridge and said body together defining an annular axial flow path from one end of the body to the other so that the inlet means is in fluid communication with both open ends of the filter holder;
   at least one pair of co-axially stacked and spaced-apart filter elements axially aligned and disposed in the filter holder so that one end of each filter element is in fluid communication with said fluid inlet means, said filter elements each comprising a coiled roll of filtering paper defining a central axial passageway for receiving the inner co-axial conduit means of said cartridge; and means for directing fluid flow from the said space between the filter elements through the inner co-axial conduit means and out the outlet means.

2. A filtering apparatus as in claim 1, wherein the means for directing fluid flow from the space between the filter elements to the outlet means includes an outlet tube axially aligned within the co-axial conduit means and attached at one end to the outlet means.

3. A filtering apparatus as in claim 2, wherein the outlet tube is attached to the outlet means by a threaded connection and serves to secure a cap on the elongate body.

4. A filtering apparatus as in claim 3, wherein a flange element is mounted on the outlet tube so that said flange element will engage at least one of said filter elements on at least said open ends of the filter holder in order to prevent bypass fluid flow.

5. A filtering apparatus as in claim 1, wherein the inlet and outlet means are located at one end of the elongate body.

6. A filtering apparatus as in claim 5, further comprising an inlet plate located between the inlet means and at least one said open end of the filter holder, said inlet plate defining a plurality of openings so that it may act as a baffle while allowing flow of fluid from the inlet means to the said at least open end of the filter holder.

7. A filtering apparatus as in claim 1, wherein the means for directing fluid flow from the space between the filter elements to the outlet means includes an opening formed in the inner co-axial conduit means proximate the said space between the filter elements.

8. A filtering apparatus as in claim 1, including at least two pairs of spaced apart filter cartridge means which are co-axially aligned within the body so that at least one said filter element of each of said two pair lies proximate each said open end of the filter holder while the other filter element in each pair lies proximate the defined space between adjacent filter cartridges so that fluid may flow into the filter holders through each of the open ends and the space between adjacent filter cartridges.

9. An apparatus for filtering fluid comprising:

an elongate body having a top, bottom and side wall means defining a cartridge receiving chamber, said body having fluid inlet and outlet means formed therein;

a removable cartridge mounted in said chamber, said cartridge comprising a pair of open ended, co-axial, spaced apart, outer and inner cylinders to form an inner annular space therebetween, said outer cylinder being spaced inwardly from the wall of the body to form an outer annular space therebetween, the said inner cylinder having centrally located aperture means formed therein to provide fluid communication to the inner annular space, and the interior of the inner cylinder and the outlet means;

a pair of stacked, vertically spaced apart, co-axial, coiled paper roll filter means disposed in the inner annular space between the said inner and outer cylinders, said paper roll being co-axial with said cylinders and coterminus with the open ends thereof, the said vertical space between said rolls being in fluid communication with the centrally located aperture means of the inner cylinder;

and means for sequentially directing a fluid from the inlet means through the outer annular space, then axially and separately and simultaneously through the pair of rolled coiled paper filter means disposed in the inner annular space, through the central aperture means formed in the said inner cylinder and the interior of said inner cylinder to said outlet means.

10. An apparatus for filtering fluids comprising:

(a) an filter body including wall means having an inner and outer surfaces, and top and bottom means, said means defining a filter cartridge receiving chamber, said body having fluid inlet and outlet means formed therein;

(b) a cylindrical filter cartridge means removably mounted in said chamber, said cartridge including a first open ended outer cylindrical filter holder having inner and outer walls and a second open-ended, co-axially disposed essentially co-terminus inner cylinder having inner and outer walls, and spaced inwardly from the first cylinder defining an annular filter means receiving space, therebetween, said second cylinder having fluid outlet aperture means formed in a central portion thereof;

(c) a filter means comprising a pair of spaced apart, co-axial, paper rolls disposed in the annular space between the inner and outer cylinders; and (d) means together with the outer walls of said outer cylinder of the cartridge means and the walls of the chamber defining a first conduit means for axial and annular flow of a fluid therebetween, in fluid communication with said fluid inlet means, and the open ends of outer cartridge cylinder and associated filter means disposed therein; and (e) means together with the inner walls of said first cylinder and the outer walls of said second cylinder defining a second fluid filtering conduit means connected with said first conduit means for directing an axial flow of a fluid from the first conduit means respectively through said filter means disposed therein, through said aperture means and the interior of said second cylinder, and to and through the outlet means.

* * * * *